US012728690B2

(12) United States Patent
Chen

(10) Patent No.: US 12,728,690 B2
(45) Date of Patent: Sep. 8, 2026

(54) SHOCK ABSORBER HAVING QUICK RELEASE FASTENING DEVICE

(71) Applicant: Yi-Fan Chen, Taichung (TW)

(72) Inventor: Yi-Fan Chen, Taichung (TW)

( * ) Notice: Subject to any disclaimer, the term of this patent is extended or adjusted under 35 U.S.C. 154(b) by 360 days.

(21) Appl. No.: 18/587,023

(22) Filed: Feb. 26, 2024

(65) Prior Publication Data

US 2025/0091402 A1 Mar. 20, 2025

(30) Foreign Application Priority Data

Sep. 14, 2023 (TW) ................................ 112209954

(51) Int. Cl.
*B60G 17/02* (2006.01)

(52) U.S. Cl.
CPC .... *B60G 17/021* (2013.01); *B60G 2204/1242* (2013.01)

(58) Field of Classification Search
CPC ...................... B60G 17/021; B60G 2204/1242
USPC ................................. 267/221; 285/311, 312
See application file for complete search history.

(56) References Cited

U.S. PATENT DOCUMENTS 9,140,325 B2 * 9/2015 Cox ..................... B60G 17/021
10,408,371 B2 * 9/2019 Floyd ...................... F16L 23/10
11,703,171 B2 * 7/2023 Hinton .................... F16L 23/06 285/312
11,873,874 B2 * 1/2024 Carr ........................ F16F 1/122
D1,114,107 S * 2/2026 Zhou ............................ D21/694
2023/0213127 A1 * 7/2023 Kendrick ............... F16L 37/20 285/311
2025/0243888 A1 * 7/2025 Chen ...................... F16B 7/182

FOREIGN PATENT DOCUMENTS

TW M511441 U 11/2015

* cited by examiner

*Primary Examiner* — Christopher P Schwartz
(74) *Attorney, Agent, or Firm* — MUNCY, GEISSLER, OLDS & LOWE, P.C.

(57) ABSTRACT

A shock absorber includes a threaded rod, a top positionally limiting seat and a bottom seat disposed at two ends of the threaded rod, a spring sleeved onto the threaded rod and abutted against the top positionally limiting seat, and a quick release fastening device including a threaded assembly and a quick release handle. The threaded assembly, which includes first and second threaded members detachably fastened to each other and screwed onto the threaded rod, is displaceable on the threaded rod by rotation to be abutted against the bottom seat or spring. The quick release handle is fixedly abutted against the first threaded member when at a tightly press position, and adapted to be hold by the user to rotate the threaded assembly when at a release position. The present invention has simple structure. The bottom seat or spring is adjustable fast and reliably without a special tool.

9 Claims, 10 Drawing Sheets

SHOCK ABSORBER HAVING QUICK RELEASE FASTENING DEVICE

BACKGROUND OF THE INVENTION

1. Field of the Invention

The present invention relates generally to shock absorbers of vehicle suspension systems and more particularly, to a shock absorber having a quick release fastening device.

2. Description of the Related Art

The current car modification market is quite mature. Adjusting the spring preload of the shock absorber to adjust the cushioning effect of the car body, and adjusting the length of the shock absorber to adjust the height of the car body are quite important needs for consumers. These adjustments enable the driver to enjoy stability and comfort, or achieve the effect of reducing the wind resistance of the car body or improving appearance.

Referring to Taiwan Patent No. M511441, the conventional shock absorber of the vehicle suspension system primarily includes a threaded rod, a positionally limiting seat disposed at an end of the threaded rod, a bottom seat screwed onto another end of the threaded rod, a spring sleeved onto the threaded rod, and a spring holder, a positioning ring and a push stopping ring, which are screwed onto the threaded rod. The positionally limiting seat is adapted to be connected to the vehicle chassis. The bottom seat is adapted to be connected to a wheel axle. Two ends of the spring are abutted against the positionally limiting seat and the spring holder respectively. The conventional manner of adjusting the length of the shock absorber is rotating the bottom seat to change the position thereof relative to the threaded rod. After the adjustment, the positioning ring is rotated to be tightly abutted against the bottom seat to fasten the bottom seat. The conventional manner of adjusting the spring preload is rotating the spring holder to change the position thereof relative to the threaded rod. After the adjustment, the push stopping ring is rotated to be tightly abutted against the spring holder to fasten the spring holder.

However, the above-described adjustment of the length of the shock absorber or the spring preload needs the use of a special wrench. Taking the adjustment of the spring preload as an example, the aforementioned wrench should be used to rotate the push stopping ring to relieve the spring holder of being fastened by the push stopping ring, and then the same wrench is used to rotate the spring holder to displace the spring holder along the threaded rod, so as to adjust the spring preload. When the required preload is achieved, the same wrench is used to rotate the push stopping ring to tightly press it on the spring holder, so as to fasten the spring holder again.

It can be known from the above description that the process of the conventional adjustment of the length of the shock absorber or the spring preload requires not only the use of the special wrench, but also displacing the component requiring movement (the push stopping ring, the spring holder or the positioning ring) along the threaded rod in a rotating manner, no matter how long the adjusting distance is. Therefore, the user needs to engage the wrench with the component requiring movement to rotate for many times. The adjusting process is quite time-consuming. Besides, the conventional adjusting structure has many components, relatively higher in cost. In addition, the conventional manner of using the special wrench to rotate the push stopping ring, the spring holder and the positioning ring to adjust the spring preload or adjust the height of the car body by adjusting the length of the shock absorber is liable to have the situation that after the car is driven for a long time, the threads of the threaded rod are filled with sand and soil, resulting in that it is difficult or even unable to rotate the push stopping ring, the spring holder and the positioning ring for the adjustment.

SUMMARY OF THE INVENTION

The present invention has been accomplished in view of the above-noted circumstances. It is an objective of the present invention to provide a shock absorber having a quick release fastening device, which is simple in structure and adjustable without the use of a special tool, and the adjusting process is fast and reliable.

To attain the above objective, the present invention provides a shock absorber which includes a threaded rod, a top positionally limiting seat disposed at an end of the threaded rod, a bottom seat disposed at another end of the threaded rod, a spring sleeved onto the threaded rod, and a quick release fastening device. The bottom seat has a top end facing toward the top positionally limiting seat. The spring has an upper end and a lower end. The upper end is abutted against the top positionally limiting seat. The off centered leverage quick release fastening device includes a threaded assembly, and a quick release handle pivotably connected with the threaded assembly in a way that the quick release handle is pivotable between a tightly press position and a release position. The threaded assembly includes a first threaded member, a second threaded member, and a fastening member detachably fastening the first threaded member and the second threaded member to each other. Each of the first threaded member and the second threaded member has an internal threaded surface. The internal threaded surfaces of the first and second threaded members collectively form a threaded hole, and are screwed onto the threaded rod so that the threaded assembly is displaceable on the threaded rod by being rotated. The threaded assembly is abutted against one of the top end of the bottom seat and the lower end of the spring. When being located at the tightly press position, the quick release handle is fixedly abutted against the first threaded member. When being located at the release position, the quick release handle is adapted for a user to hold the quick release handle to rotate the threaded assembly.

As a result, the quick release fastening device in the present invention can be substituted for the conventional spring holder and push stopping ring for fastening the lower end of the spring, or the quick release fastening device in the present invention can be substituted for the conventional positioning ring for fastening the bottom seat. Of course, the quick release fastening device in the present invention can be substituted for both the above two. The shock absorber of the present invention has simple structure and relatively fewer components, and is relatively lower in cost. When the user wants to adjust the length of the shock absorber or the spring preload, the user can only use the hand thereof to pivot the quick release handle to the release position, and then hold the quick release handle to rotate the quick release fastening device so as to adjust the position of the lower end of the spring for adjusting the spring preload, or adjust the position of the bottom seat for adjusting the length of the shock absorber and thereby adjusting the height of the car body. After the adjustment, the user can only use the hand thereof to pivot the quick release handle back to the tightly press position to fasten the lower end of the spring or the bottom seat again. The above-described adjusting process is fast and reliable, and requires no additional tool. Besides, when the adjusting distance is relatively longer, the user can detach or loosen the fastening member to temporarily relieve the threaded assembly of the screwing connection thereof with the threaded rod, such that the quick release fastening device can be directly moved to the required position, instead of being rotated to displace, so the adjusting efficiency can be highly improved. In addition, when installing or detaching the quick release fastening device in the present invention, the user can detach the fastening member to relieve the first and second threaded members of the fastened relation therebetween, such that the quick release fastening device has no need to be installed or detached from an end of the threaded rod axially. The quick release fastening device can be directly installed or detached radially at any position of the threaded rod, so the installing and detaching efficiency can be highly improved. Furthermore, when adjusting the length of the shock absorber or the spring preload, the user can loosen the quick release fastening device to provide a relatively lager interval between the threaded assembly and the threaded rod, and can even remove the entire quick release fastening device from the threaded rod, to make the adjusting process more convenient and faster and avoid the problem that the threaded rod being filled with sand and soil causes difficulty to the adjustment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
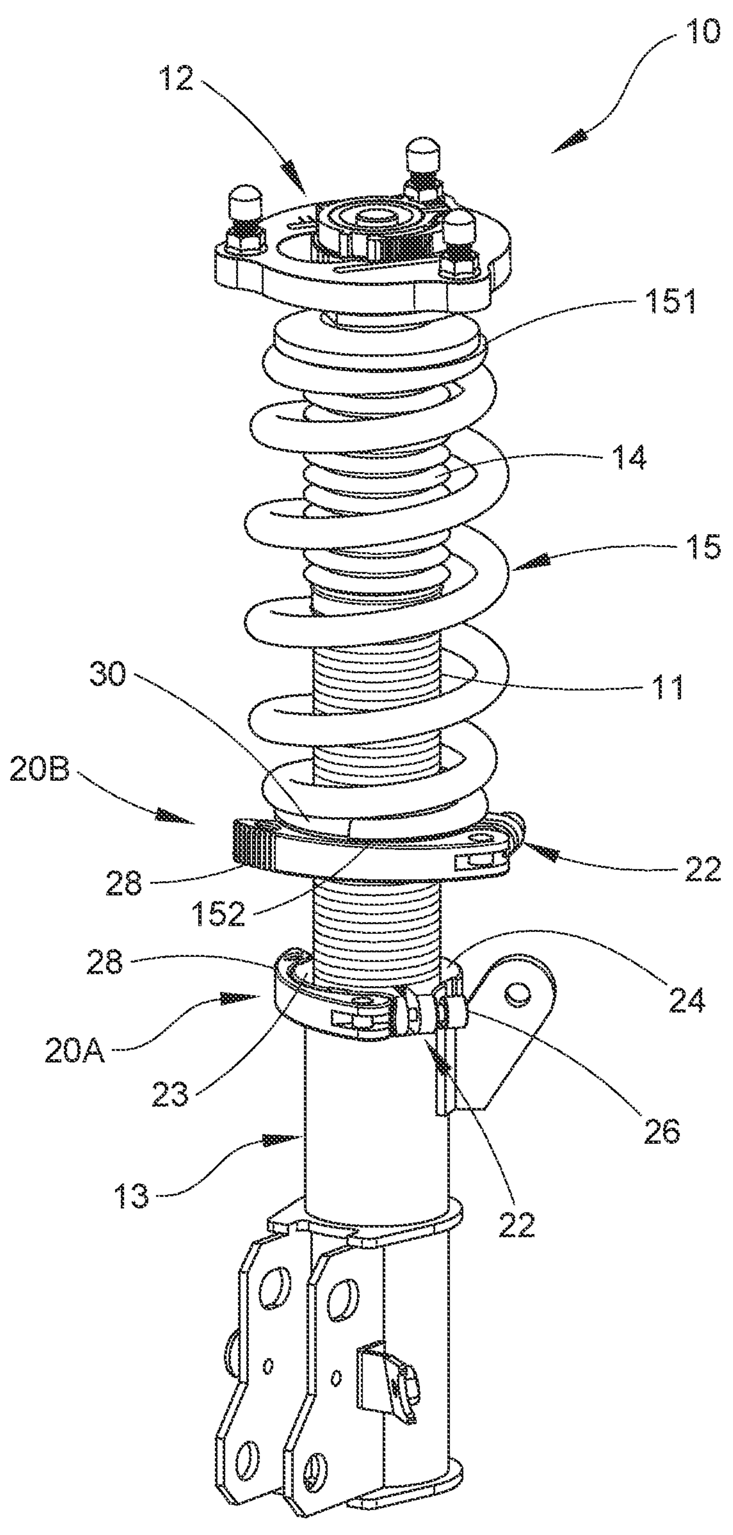
FIG. 1 is an assembled perspective view of a shock absorber according to a first preferred embodiment of the present invention.

First of all, it is to be mentioned that same or similar reference numerals used in the following embodiments and the appendix drawings designate same or similar elements or the structural features thereof throughout the specification for the purpose of concise illustration of the present invention. It should be noticed that for the convenience of illustration, the components and the structure shown in the figures are not drawn according to the real scale and amount, and the features mentioned in each embodiment can be applied in the other embodiments if the application is possible in practice. Besides, when it is mentioned that an element is disposed on another element, it means that the former element is directly disposed on the latter element, or the former element is indirectly disposed on the latter element through one or more other elements between aforesaid former and latter elements. When it is mentioned that an element is directly disposed on another element, it means that no other element is disposed between aforesaid former and latter elements.

Figure 2:
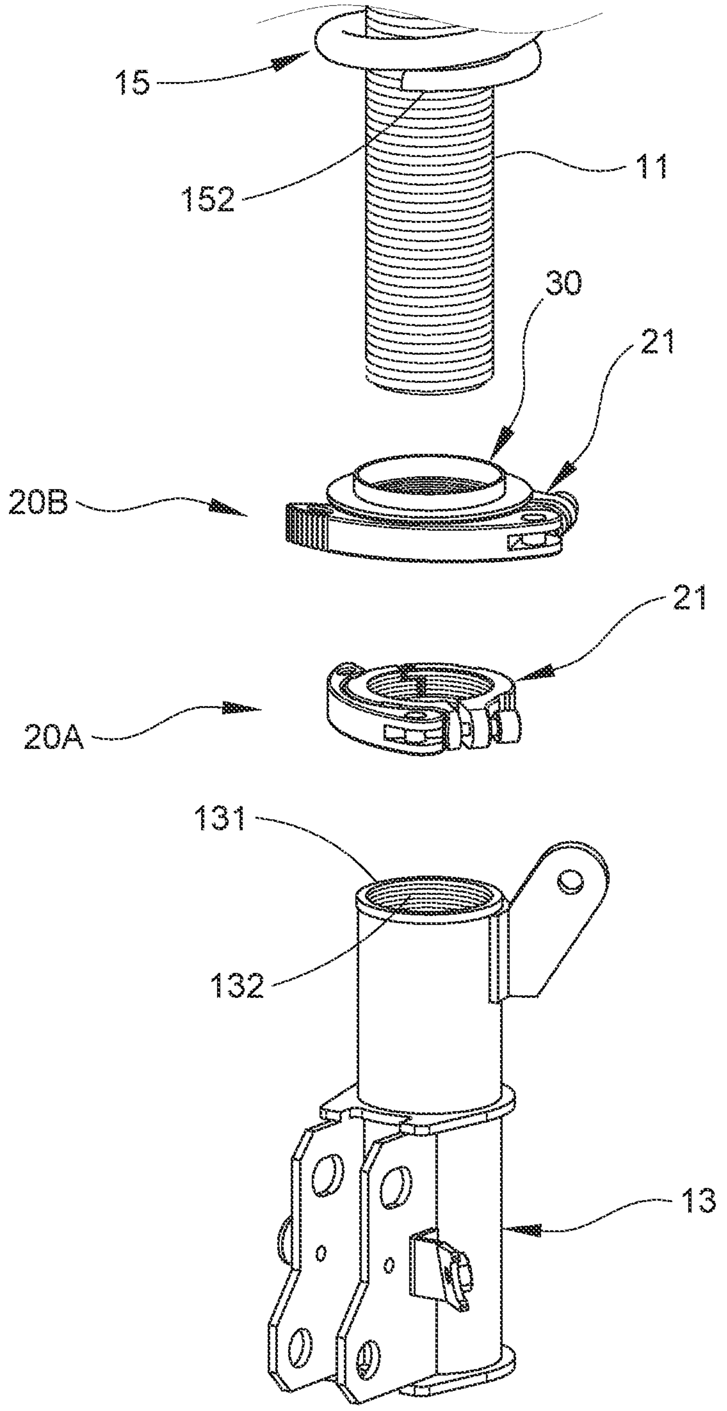
FIG. 2 is an exploded perspective view of the shock absorber according to the first preferred embodiment of the present invention.

Referring to FIG. 1 and FIG. 2, a shock absorber 10 according to a first preferred embodiment of the present invention includes a threaded rod 11, a top positionally limiting seat 12 and a bottom seat 13 disposed at two ends of the threaded rod 11 respectively, and a pipe 14, a spring 15 and two quick release fastening devices 20A and 20B, which are sleeved onto the threaded rod 11 and located between the top positionally limiting seat 12 and the bottom seat 13.

The threaded rod 11 actually includes a central axle (not shown) provided without thread. The top positionally limiting seat 12 is detachably fastened to the central axle. The pipe 14 is disposed at the bottom of the top positionally limiting seat 12 and covers the central axle. This part is relatively less related to the technical features of the present invention, thereby not described in detail hereinafter.

The bottom seat 13 is shaped as a cylindrical tube, having a top end 131, and a threaded hole 132 extending downwardly from the top end 131. The bottom seat 13 is screwed onto the threaded rod 11 by the threaded hole 132 and the top end 131 faces toward the top positionally limiting seat 12. The user can rotate the bottom seat 13 to adjust the position of the bottom seat 13 relative to the threaded rod 11, so as to adjust the distance between the bottom seat 13 and the top positionally limiting seat 12, thereby adjusting the length of the shock absorber 10. After the adjustment, the user uses the quick release fastening device 20A to fasten the bottom seat 13, that will be specified hereinafter. The top positionally limiting seat 12 is adapted to be connected to the vehicle chassis. The bottom seat 13 is adapted to be connected to the wheel axle. Therefore, adjusting the distance between the bottom seat 13 and the top positionally limiting seat 12 can adjust the height of the car body relative to the wheel.

The spring 15 has an upper end 151 and a lower end 152. The upper end 151 is abutted against the top positionally limiting seat 12. The lower end 152 is abutted against the quick release fastening device 20B. The user can adjust the position of the quick release fastening device 20B, that will be specified hereinafter, to adjust the position of the lower end 152 of the spring 15, so as to adjust the preload of the spring 15 and thereby adjust the cushioning effect of the shock absorber 10 on the car body.

Referring to FIG. 3 to FIG. 7, in this embodiment, the quick release fastening device 20A only includes a quick release main body 21, but the quick release fastening device 20B not only includes a quick release main body 21 exactly the same with the quick release fastening device 20A, but also includes a spring embedded seat 30. In the following, only the quick release main body 21 of the quick release fastening device 20A will be described. The quick release main body 21 of the quick release fastening device 20B will not be repeatedly described.

Figure 3:
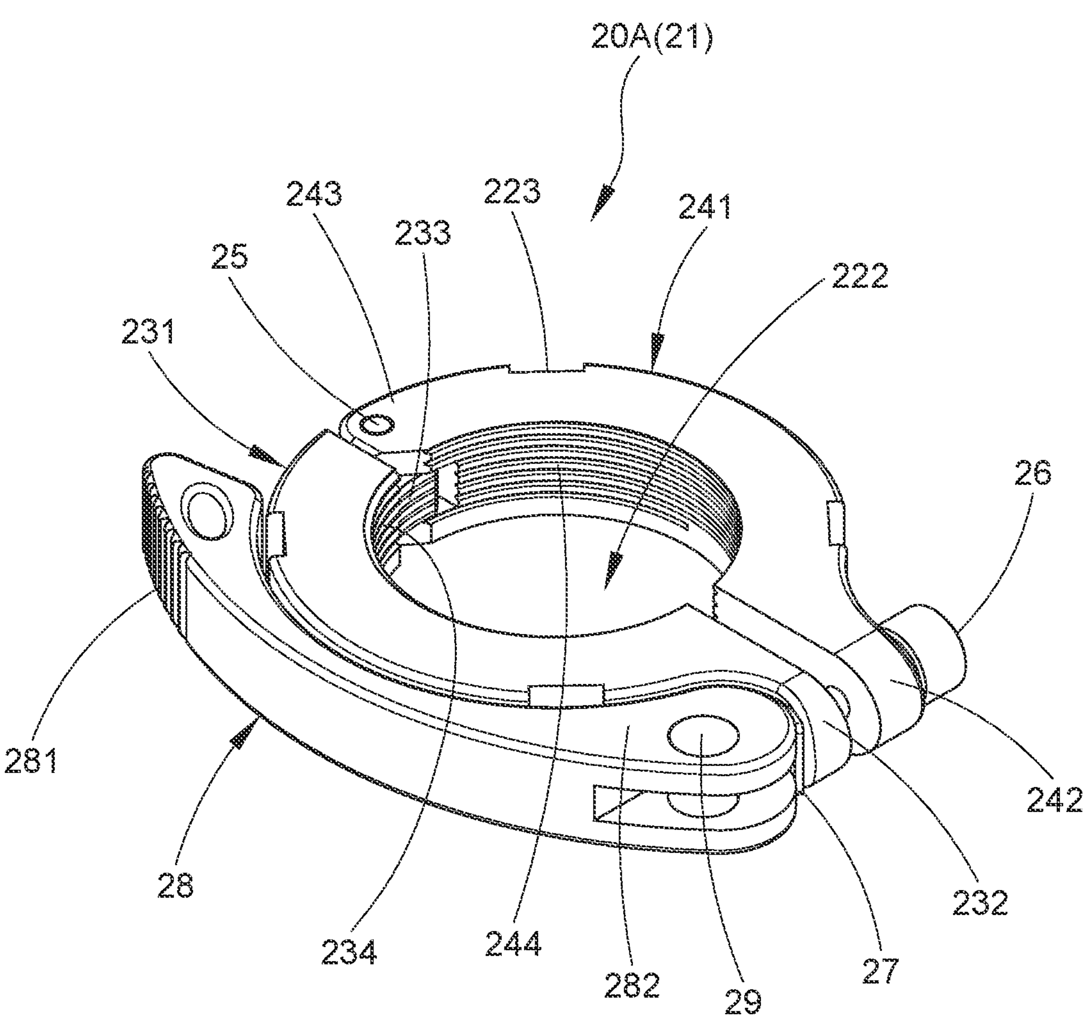
FIG. 3 is an assembled perspective view of a quick release fastening device of the shock absorber according to the first preferred embodiment of the present invention.
Figure 4:
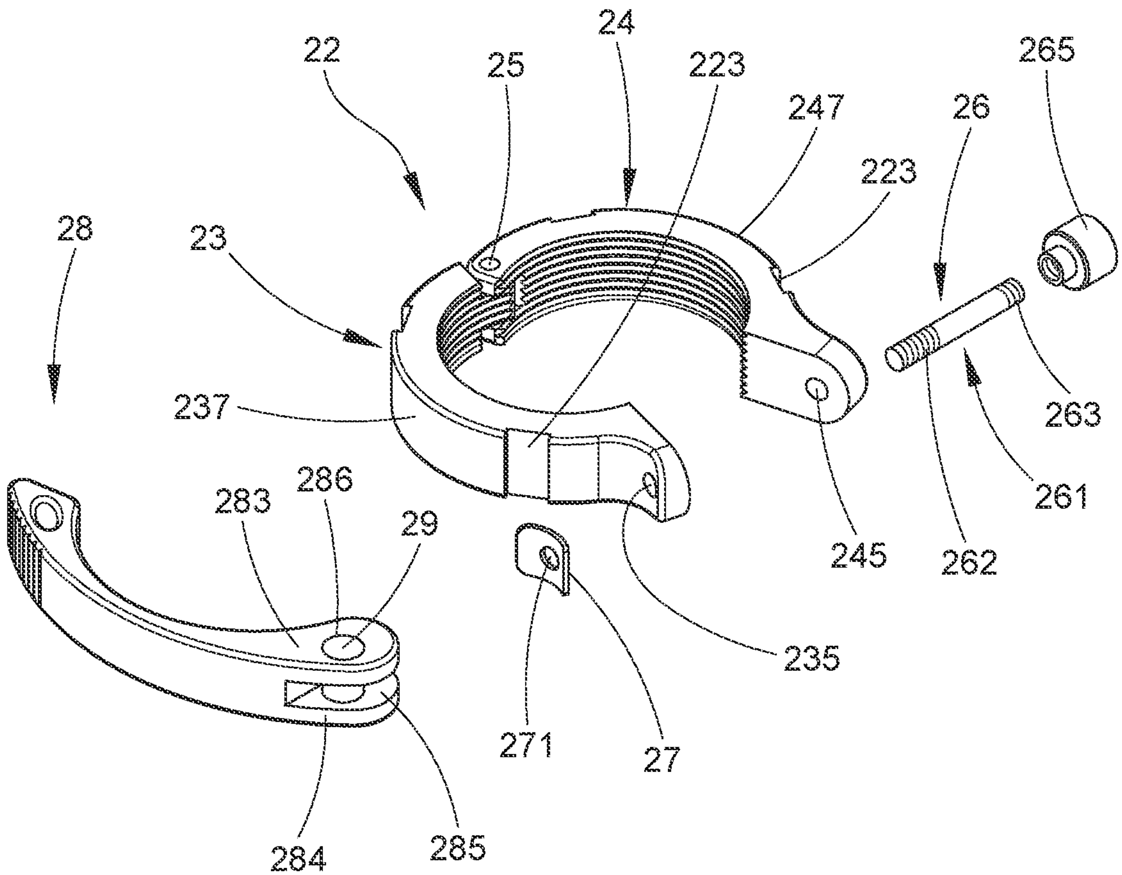
FIG. 4 is an exploded perspective view of the quick release fastening device shown in FIG. 3.

As shown in FIG. 3 and FIG. 4, the quick release main body 21 includes a threaded assembly 22 for being screwed onto the threaded rod 11, and a quick release handle 28 for tightly pressing the threaded assembly 22 on the threaded rod 11. The threaded assembly 22 includes a first threaded member 23, a second threaded member 24, a first pivot 25, a fastening member 26, and a washer 27. The quick release main body 21 further includes a second pivot 29 making the quick release handle 28 pivotably connected with the threaded assembly 22.

Each of the first and second threaded members 23 and 24 includes a main body 231 or 241 approximately shaped as a semi-circular ring, and a fastened end portion 232 or 242 extending from an end of the main body 231 or 241. Each main body 231 or 241 is provided at another end thereof with a pivotably connected end portion 233 or 243. The first pivot 25 is inserted through the pivotably connected end portions 233 and 243 to make the first and second threaded members 23 and 24 pivotably connected with each other. Therefore, the first and second threaded members 23 and 24 are pivotable relative to each other from the status as shown in FIG. 3, wherein they are collectively shaped as a circular ring, to open up such as the status as shown in FIG. 4. In this way, the user has no need to remove the bottom seat 13 from the threaded rod 11, and can still install the first and second threaded members 23 and 24 onto the threaded rod 11 directly. Each of the first and second threaded members 23 and 24 has an internal threaded surface 234 or 244. In the usage condition, the internal threaded surfaces 234 and 244 of the first and second threaded members 23 and 24 collectively form a threaded hole 222, and are screwed onto the threaded rod 11. Then, the user inserts the fastening member 26 through the fastened end portions 232 and 242 of the first and second threaded members 23 and 24, and installs the quick release handle 28, so as to make the first and second threaded members 23 and 24 fastened to each other and fastened to the threaded rod 11.

Specifically speaking, the quick release handle 28 has a hold end portion 281 and a pivotably connected end portion 282. The pivotably connected end portion 282 includes an upper section 283, a lower section 284, an open groove 285 located between the upper section 283 and the lower section 284, and a through hole 286 penetrating through the upper section 283 and the lower section 284 and passing through the open groove 285. The second pivot 29 is inserted through the through hole 286, and the second pivot 29 has a threaded hole (not shown). The fastened end portions 232 and 242 of the first and second threaded members 23 and 24 each have a through hole 235 or 245. The washer 27 also has a through hole 271. The fastening member 26 includes a stud 261 and a nut 265. The stud 261 is provided at two ends thereof with threaded sections 262 and 263 respectively. The stud 261 is inserted through the through holes 235 and 245 of the first and second threaded members 23 and 24 and the through hole 271 of the washer 27. The threaded section 262 is inserted in the open groove 285 of the quick release handle 28 and fixedly screwed into the threaded hole of the second pivot 29. The nut 265 is screwed onto the threaded section 263 for the user to rotate the nut 265 to adjust the distance d between the fastened end portions 232 and 242 of the first and second threaded members 23 and 24, such that the tightness of the threaded assembly 22 can be adjusted conveniently.

Figure 5:
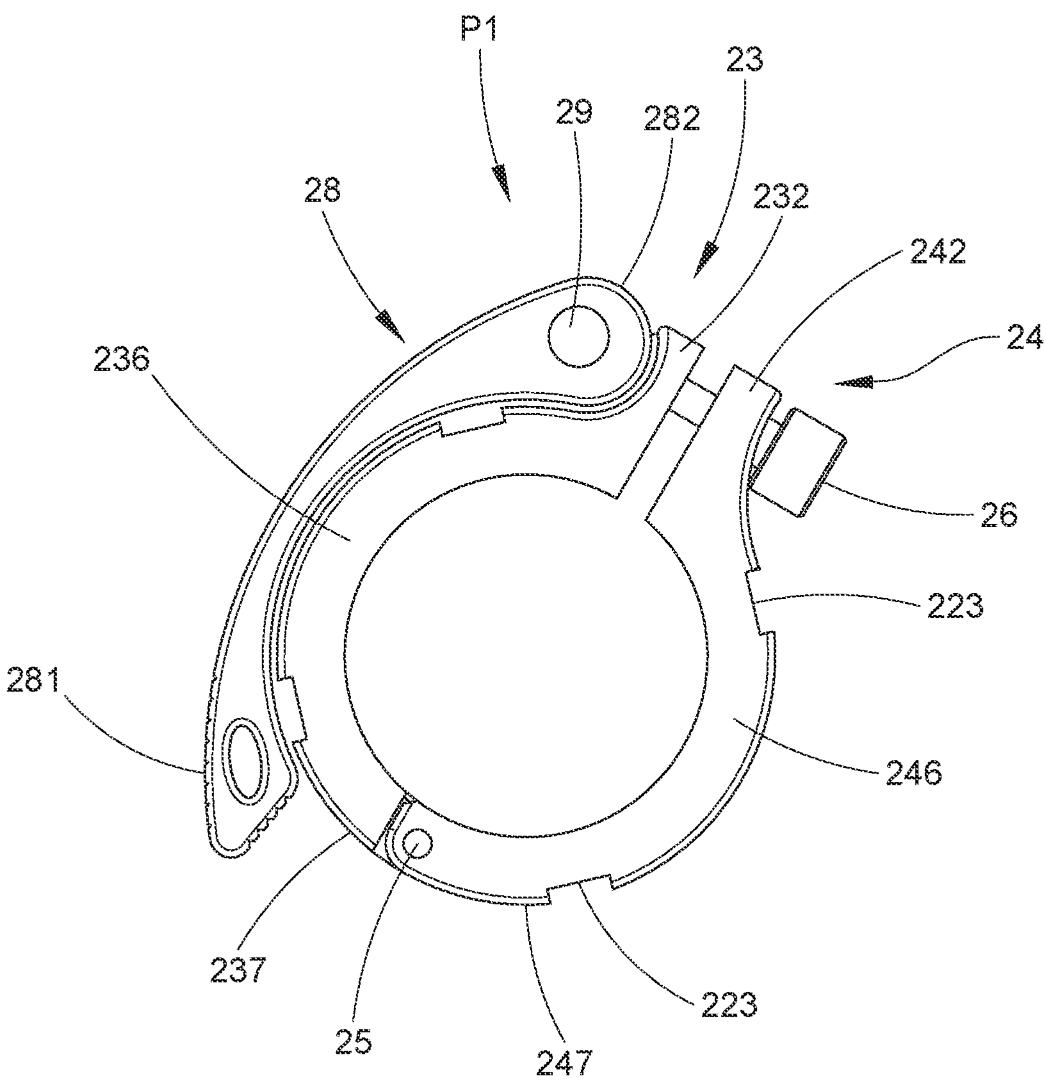
FIG. 5 is a bottom view of the quick release fastening device shown in FIG. 3.
Figure 6:
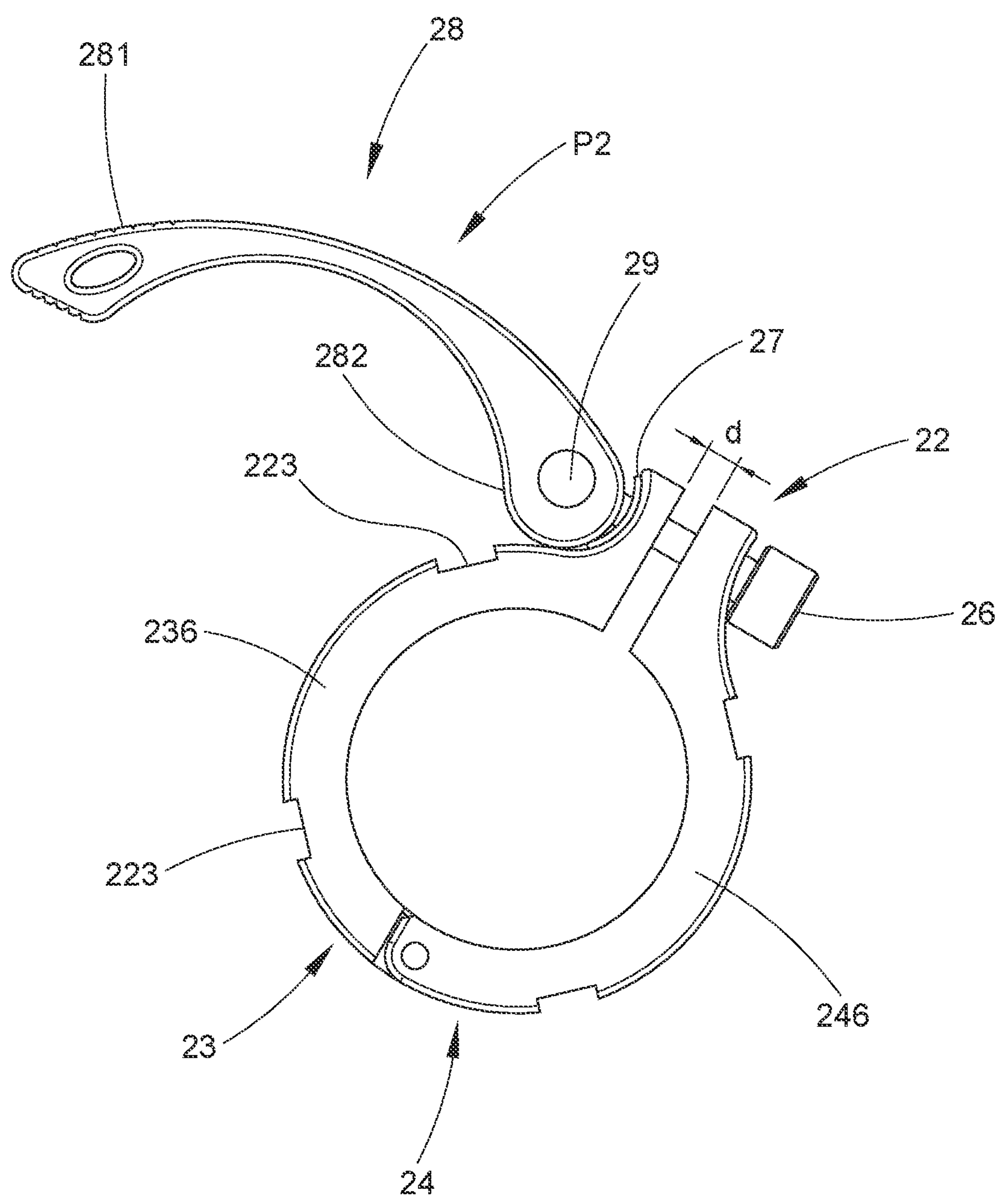
FIG. 6 is similar to FIG. 5, but showing a different position of a quick release handle of the quick release fastening device.

As a result, the quick release handle 28 is pivotable relative to the threaded assembly 22 between a tightly press position P1 as shown in FIG. 5 and a release position P2 as shown in FIG. 6. When the quick release handle 28 is located at the tightly press position P1, the pivotably connected end portion 282 is fixedly abutted against the fastened end portion 232 of the first threaded member 23 through the washer 27 (or there may be no such washer 27), so as to tightly press the threaded assembly 22 on the threaded rod 11. When the quick release handle 28 is located at the release position P2, the threaded assembly 22 is not tightly pressed on the threaded rod 11. The user can hold the hold end portion 281 of the quick release handle 28 to rotate the quick release fastening device 20A. Therefore, the user can only use the hand thereof to pivot the quick release handle 28 of the quick release fastening device 20A to the release position P2, and then the user can rotate the quick release fastening device 20A and the bottom seat 13 to adjust the position thereof. After the adjustment of the position of the bottom seat 13, the user can abut the abutted surfaces 236 and 246 of the first and second threaded members 23 and 24 of the quick release fastening device 20A, which face toward the bottom seat 13, against the top end 131 of the bottom seat 13, and then pivot the quick release handle 28 to the tightly press position P1 to fasten the bottom seat 13.

Figure 7:
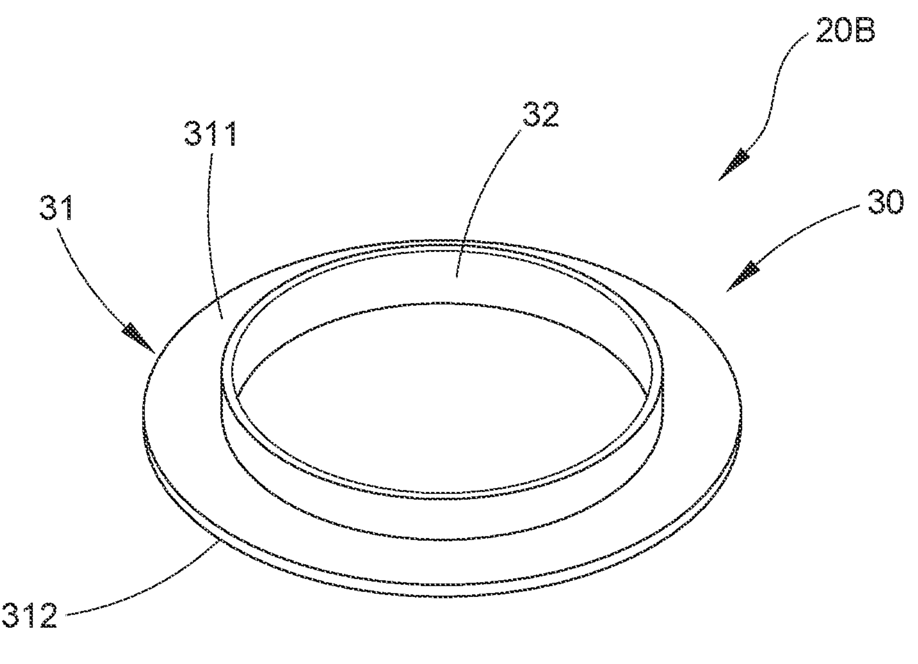
FIG. 7 is an exploded perspective view of another quick release fastening device of the shock absorber according to the first preferred embodiment of the present invention.
Figure 7:
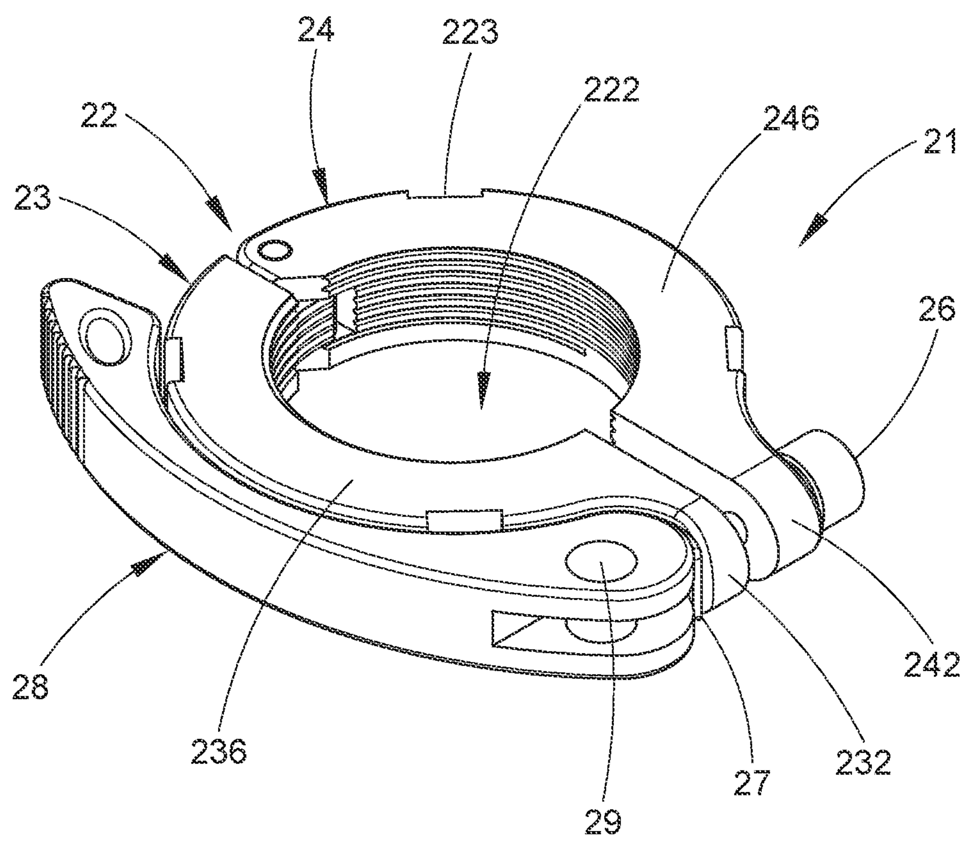

Referring to FIG. 7, the quick release main body 21 of the quick release fastening device 20B is exactly the same with the above-described quick release main body 21. In fact, the quick release fastening device 20B may include no such spring embedded seat 30, but be directly abutted against the lower end 152 of the spring 15 by the abutted surfaces 236 and 246 of the quick release main body 21 facing toward the spring 15. However, in this embodiment, the spring embedded seat 30 is further disposed on the abutted surfaces 236 and 246 of the quick release main body 21 of the quick release fastening device 20B for attaining even better effect, that will be specified in the following.

The spring embedded seat 30 includes a base 31 shaped as a circular ring, and a flange 32 located at the inner rim of the base 31 and protruding from an upper surface 311 of the base 31. The outer radius of the flange 32 is a little smaller than the inner radius of the spring 15. The spring embedded seat 30 is sleeved onto the threaded rod 11. A lower surface 312 of the base 31 is abutted on the abutted surfaces 236 and 246 of the first and second threaded members 23 and 24. The upper surface 311 of the base 31 and the lower end 152 of the spring 15 are abutted against each other. The flange 32 is embedded in the spring 15. As a result, the spring embedded seat 30 can prevent the spring 15 from moving radially, so as to lower the abnormal noise produced by the shock absorber 10 in operation.

It can be known from the above description that when the user wants to adjust the preload of the spring 15, the user can only use the hand thereof to pivot the quick release handle 28 of the quick release fastening device 20B to the release position P2, so as to relieve the threaded assembly 22 of the quick release fastening device 20B of being fastened to the threaded rod 11. Then, the user can hold the quick release handle 28 to rotate the quick release fastening device 20B, so as to displace the quick release fastening device 20B along the threaded rod 11 to change the position of the lower end 152 of the spring 15, thereby adjusting the preload of the spring 15. After the adjustment, pivoting the quick release handle 28 to the tightly press position P1 can fasten the quick release fastening device 20B.

The shock absorber of the present invention 10 has simple structure and relatively fewer components, and is relatively lower in cost. Besides, the above-described processes of using the quick release fastening devices 20A and 20B to adjust and fasten the bottom seat 13 and the spring 15 only need to be performed by the hand, but in no need of an additional tool, that is quite convenient, fast and reliable. In order to further rotate the quick release fastening devices 20A and 20B even tighter or fine tune the positions thereof, the threaded assembly 22 of each of the quick release fastening devices 20A and 20B in this embodiment further includes four recesses 223 (unlimited in amount) provided on the outer arc surfaces 237 and 247 of the first and second threaded members 23 and 24. After using the hand to rotate the threaded assembly 22 tight, the user can further engage a tool (not shown) with the recess 223 and rotate the threaded assembly 22 by the tool.

Besides, when the quick release fastening device 20A or 20B is to be moved for a relatively longer distance, the user can rotate the nut 265 to increase the distance d between the fastened end portions 232 and 242 of the first and second threaded members 23 and 24, so as to loosen the threaded assembly 22 from the threaded rod 11 temporarily, which means temporarily relieving the threaded assembly 22 of the screwing connection thereof with the threaded rod 11. In this way, the quick release fastening device 20A or 20B can be directly moved to the required position, instead of being rotated to displace, so the adjusting efficiency can be highly improved. In addition, when installing or detaching the quick release fastening device 20A or 20B, the user can detach the fastening member 26 to relieve the first and second threaded members 23 and 24 of the fastened relation therebetween, so as to make the first and second threaded members 23 and 24 open up as shown in FIG. 4. In this way, the quick release fastening device 20A or 20B has no need to be installed or detached from an end of the threaded rod 11 axially, but can be directly installed or detached radially at any position of the threaded rod 11, so the installing and detaching efficiency can be highly improved. Furthermore, when adjusting the length of the shock absorber or the spring preload, the user can loosen the quick release fastening device 20A or 20B to provide a relatively lager interval between the threaded assembly 22 and the threaded rod 11, and can even remove the entire quick release fastening device 20A or 20B from the threaded rod 11, to make the adjusting process more convenient and faster and avoid the problem that the threaded rod 11 being filled with sand and soil causes difficulty to the adjustment.

Figure 8:
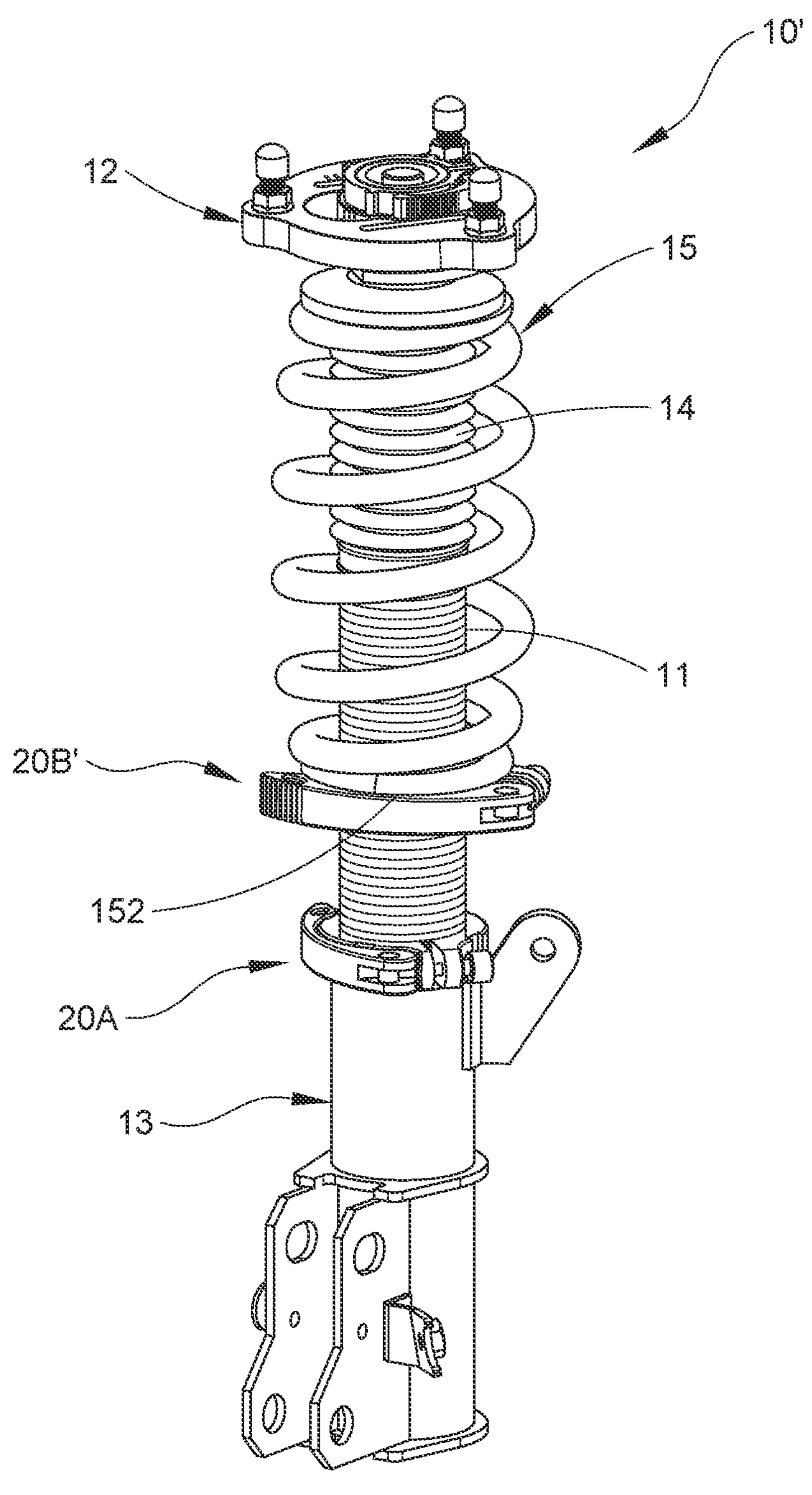
FIG. 8 is an assembled perspective view of a shock absorber according to a second preferred embodiment of the present invention.
Figure 9:
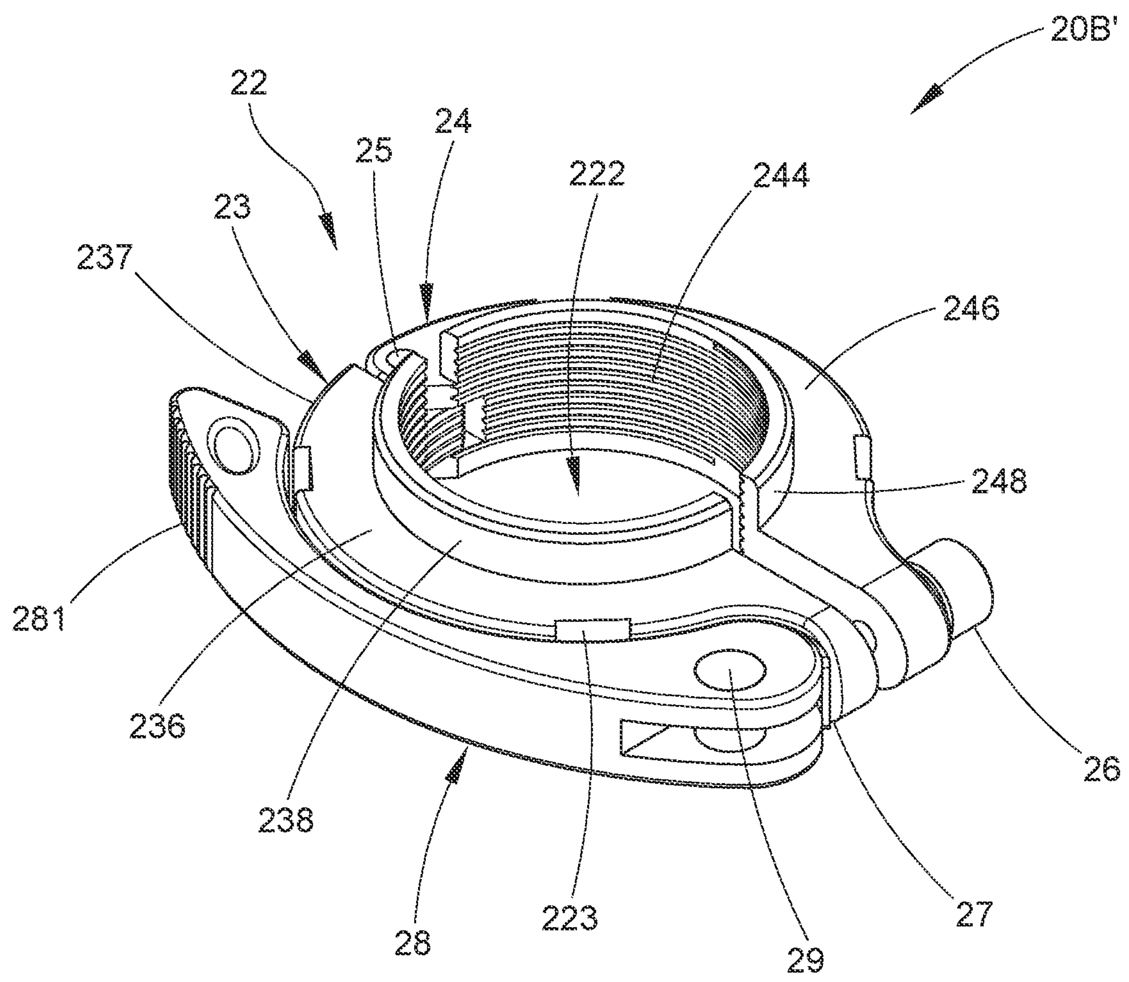
FIG. 9 and FIG. 10 are assembled perspective views of a quick release fastening device of the shock absorber according to the second preferred embodiment of the present invention.
Figure 10:
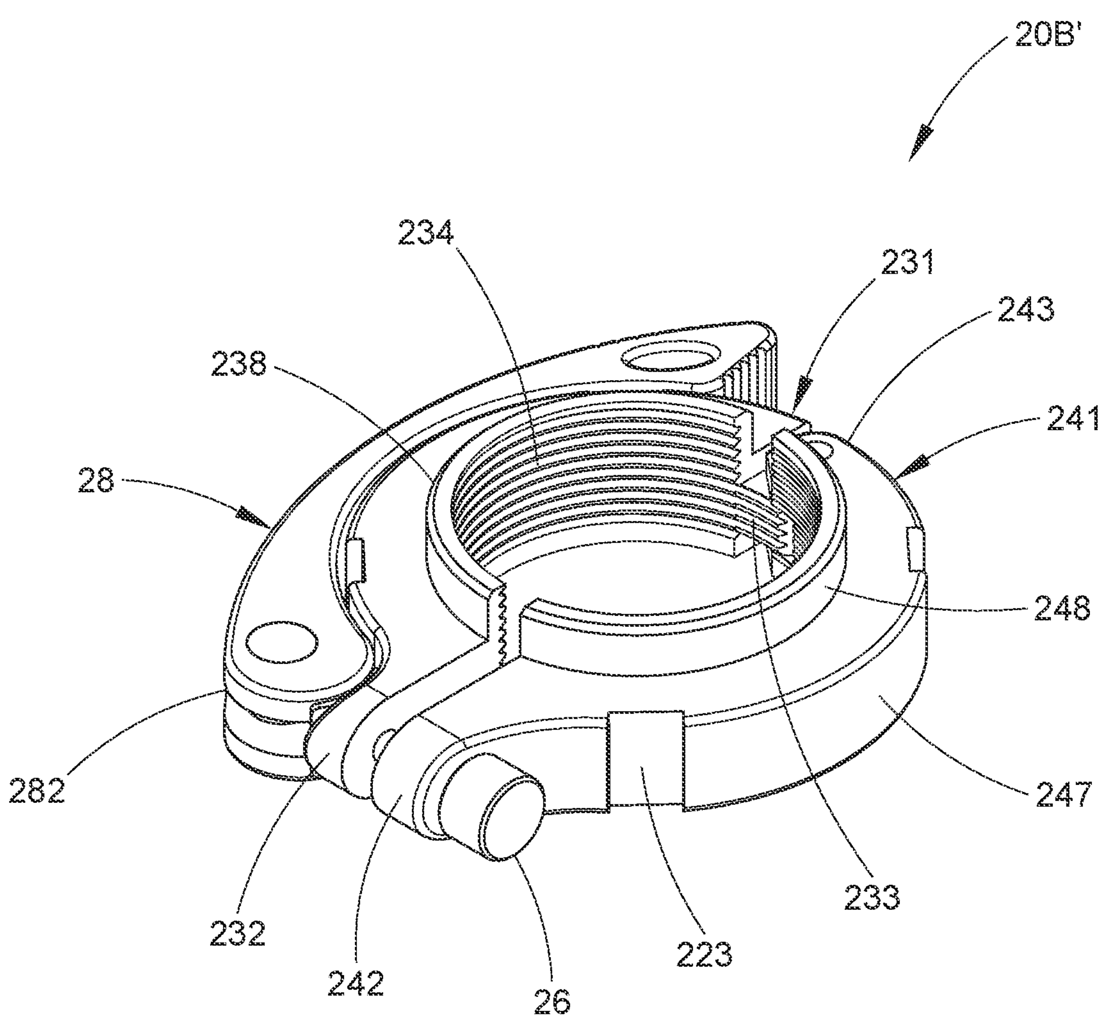

Referring to FIG. 8 to FIG. 10, a shock absorber 10' according to a second preferred embodiment of the present invention is similar to the above-described shock absorber 10 according to the first preferred embodiment, but the difference therebetween lies in the quick release fastening device for fastening the lower end 152 of the spring 15. This quick release fastening device 20B' in this embodiment is similar to the above-described quick release fastening device 20A, but the first and second threaded members 23 and 24 of the quick release fastening device 20B' each further include a flange 238 or 248 protruding from the abutted surface 236 or 246 of the main body 231 or 241. The abutted surfaces 236 and 246 of the main bodies 231 and 241 of the first and second threaded members 23 and 24 are abutted against the lower end 152 of the spring 15. The flanges 238 and 248 of the first and second threaded members 23 and 24 are embedded in the spring 15. As a result, the flanges 238 and 248 of the first and second threaded members 23 and 24 can bring the effect similar to the effect of the spring embedded seat 30 of the quick release fastening device 20B in the first preferred embodiment, to prevent the spring 15 from moving radially, so as to lower the abnormal noise produced by the shock absorber 10' in operation. Other structural features and effects of this embodiment are the same with those of the first preferred embodiment, thereby not repeatedly described here.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorber comprising:

a threaded rod;

a top positionally limiting seat disposed at an end of the threaded rod;

a bottom seat disposed at another end of the threaded rod, the bottom seat having a top end facing toward the top positionally limiting seat;

a spring sleeved onto the threaded rod, the spring having an upper end and a lower end, the upper end being abutted against the top positionally limiting seat; and a quick release fastening device comprising:

a threaded assembly comprising a first threaded member, a second threaded member, and a fastening member detachably fastening the first threaded member and the second threaded member to each other, each of the first threaded member and the second threaded member having an internal threaded surface, the internal threaded surface of the first threaded member and the internal threaded surface of the second threaded member collectively forming a threaded hole and being screwed onto the threaded rod so that the threaded assembly is displaceable on the threaded rod by being rotated, the threaded assembly being abutted against one of the top end of the bottom seat and the lower end of the spring; and a quick release handle pivotably connected with the threaded assembly in a way that the quick release handle is pivotable between a tightly press position and a release position, when being located at the tightly press position, the quick release handle being fixedly abutted against the first threaded member, when being located at the release position, the quick release handle being adapted for a user to hold the quick release handle to rotate the threaded assembly.

2. The shock absorber as claimed in claim 1, wherein each of the first threaded member and the second threaded member comprises a main body, and a flange protruding from an abutted surface of the main body; the abutted surface and the lower end of the spring are abutted against each other; the flange is embedded in the spring.

3. The shock absorber as claimed in claim 1, wherein the threaded assembly further comprises a spring embedded seat sleeved onto the threaded rod; the spring embedded seat comprises a base, and a flange protruding from an upper surface of the base; a lower surface of the base is abutted on the first threaded member and the second threaded member; the upper surface of the base and the lower end of the spring are abutted against each other; the flange is embedded in the spring.

4. The shock absorber as claimed in claim 1, wherein each of the first threaded member and the second threaded member has an outer arc surface; the threaded assembly comprises at least one recess provided on the outer arc surface for the user to engage a tool with the recess and rotate the threaded assembly by the tool.

5. The shock absorber as claimed in claim 1, wherein each of the first threaded member and the second threaded member has a pivotably connected end portion and a fastened end portion; the threaded assembly further comprises a first pivot; the first pivot is inserted through the pivotably connected end portions of the first threaded member and the second threaded member to make the first threaded member and the second threaded member pivotably connected with each other; the fastening member is detachably inserted through the fastened end portions of the first threaded member and the second threaded member.

6. The shock absorber as claimed in claim 5, wherein the shock absorber further comprises a second pivot inserted through the quick release handle; the fastening member is detachably fastened to the second pivot.

7. The shock absorber as claimed in claim 6, wherein the fastening member comprises a stud and a nut; the stud is inserted through the fastened end portions of the first threaded member and the second threaded member; an end of the stud is fixedly screwed into the second pivot; the nut is screwed onto another end of the stud for the user to rotate the nut to adjust a distance between the fastened end portion of the first threaded member and the fastened end portion of the second threaded member.

8. The shock absorber as claimed in claim 7, wherein the shock absorber further comprises a washer disposed between the fastened end portion of the first threaded member and the quick release handle; the stud is inserted through the washer; when being located at the tightly press position, the quick release handle is abutted against the fastened end portion of the first threaded member through the washer.

9. The shock absorber as claimed in claim 8, wherein each of the first threaded member and the second threaded member has an outer arc surface; the threaded assembly comprises at least one recess provided on the outer arc surface for the user to engage a tool with the recess and rotate the threaded assembly by the tool.

* * * * *